(12) United States Patent
Clark (10) Patent No.: US 10,721,349 B2
(45) Date of Patent: Jul. 21, 2020

(54) SMART PHONE PLATFORM FOR KIDS

(71) Applicant: Richard Clark, San Carlos, CA (US)

(72) Inventor: Richard Clark, San Carlos, CA (US)

( * ) Notice: Subject to any disclaimer, the term of this patent is extended or adjusted under 35 U.S.C. 154(b) by 0 days.

(21) Appl. No.: 16/379,349

(22) Filed: Apr. 9, 2019

(65) Prior Publication Data

US 2019/0238676 A1 Aug. 1, 2019

Related U.S. Application Data

(63) Continuation of application No. 15/295,786, filed on Oct. 17, 2016, now Pat. No. 10,298,747.

(51) Int. Cl.
| | |
|---|---|
| *H04W 4/16* | (2009.01) |
| *H04W 88/06* | (2009.01) |
| *H04M 1/725* | (2006.01) |
| *H04M 1/272* | (2006.01) |
| *H04W 84/12* | (2009.01) |

(52) U.S. Cl.
CPC ..... *H04M 1/72588* (2013.01); *H04M 1/2725* (2013.01); *H04W 84/12* (2013.01)

(58) Field of Classification Search
CPC .......... H04M 1/72588; H04M 1/2725; H04W 84/12; H04W 88/06
See application file for complete search history.

(56) References Cited

U.S. PATENT DOCUMENTS

| | | | | |
|---|---|---|---|---|
| 2006/0142012 | A1* | 6/2006 | Kirchhoff | ......... H04M 3/42357 455/445 |
| 2009/0052649 | A1* | 2/2009 | Li | .................... H04M 1/274516 379/211.01 |
| 2010/0098057 | A1* | 4/2010 | Stewart | ................... H04M 3/46 370/352 |
| 2013/0065569 | A1* | 3/2013 | Leipzig | .................. G06F 9/453 455/416 |
| 2013/0157655 | A1* | 6/2013 | Smith, II | .............. H04W 88/06 455/426.1 |

* cited by examiner

*Primary Examiner* — Lan-Huong Truong
(74) *Attorney, Agent, or Firm* — L/O of Alexis J. Saenz (57) ABSTRACT

A phone and system is disclosed which includes a programmed button(s) that initiates a telephone call from the phone to a second phone. In some embodiments, the phone may be a toy or instructional equipment configured to provide for example, children a device to learn how to converse over a telephone call with trusted parties. The phone may initiate a phone call request when a programmed button is pressed by connecting with a computing device that has a wireless local area network (LAN) transceiver and a connection to the telephone network (for example, a smartphone, a tablet, or a wearable device). The phone call request may then be re-routed through the telephone network to the second phone being called and communication may occur between the two phones through the intermediary device. Trusted and restricted communication may thus occur between parents/grandparents and children.

16 Claims, 3 Drawing Sheets

SMART PHONE PLATFORM FOR KIDS

CROSS-REFERENCE TO RELATED APPLICATION

This application claims benefit under 35 U.S.C. § 119(e) of pending U.S. Non-provisional application Ser. No. 15/295,786 filed Oct. 17, 2016, which is hereby incorporated by reference herein in its entirety.

FIELD

The subject disclosure relates to consumer electronics, and more particularly, to a smart phone platform for kids.

BACKGROUND

Currently, children may not intuitively understand how to operate telephones and hold conversations. More importantly, current phones do not automatically restrict who may call or receive a call from a child. There are some software apps which allow a parent/guardian to add rules on a phone which block sites that can be visited and restricts calls to specified people. However, for this to function, the child needs to own their own phone with a subscribed service line (or pre-paid plan). For children, this can be expensive and impractical for the amount of usage they are likely to incur.

Typically, children begin to learn phone usage through toy phones. Past inventions for toy phones on the market targeted for kids were very simple in functionality and design, typically having buttons that light up and an empty plastic handset for the kids to hold to emulate having a real phone. But the phones were just toys and did not do much else besides make sound and lights, and have no means to make external network communication and feature enhancements with other devices, especially in the advent of the Internet of Things.

Other technology options that exist today such as mobile phones (iOS, Android, other) and tablets are not really designed for children. Thus a child typically has to use their parent's phone. Arranging times to call or video chat can often be a cumbersome process and usually relies on initiating a connection through a parent's cell phone or tablet and then passing that device to a young child only to have them accidentally hang up the call or drop and damage the device. Alternatively, when kids want to call a family member or friend, they have to ask a parent to help setup a call to that special someone. Some parents are fine having their young children use an iPhone, iPad, Android phone/tablet whenever they want, but allowing them to use products like these increases cases of childhood obesity as kids tend to sit on the couch/chair using these devices, so they are not conducive to getting kids to move around and exercise. Thus, limited usage of such a device may be ideal. These products also tend to be complicated for young children especially at the early age of 2 and beyond.

As can be seen, there is a need for a safe phone and system that allows a child to learn how to use the telephone system under limited usage.

SUMMARY

In one aspect of the disclosure, a computer program product for connecting a telephone call between a first phone which is not directly connected to a telephone network and a second phone which is connected to the telephone network through an intermediary computing device, comprises a non-transitory computer readable storage medium having computer readable program code embodied therewith. The computer readable program is being configured, when executed by a computer processor, to: store a telephone number associated with the second phone; program a button on the first phone to send a request to the stored telephone number; initiate a telephone call from the first phone through the intermediary computing device in response to the programmed button on the first phone being triggered, wherein the request from the first phone is sent to the intermediary computing device using a wireless local area network (LAN) protocol; and re-route the telephone call through the intermediary computing device to the second phone using the telephone network, wherein data transmitted to and from the second phone and the intermediary computing device is transmitted through the telephone network and data to and from the intermediary computing device and the first phone is transmitted through a wireless LAN.

In yet another aspect, a method for connecting a telephone call between a first phone which is not directly connected to a telephone network and a second phone which is connected to the telephone network through an intermediary computing device, comprises storing a telephone number associated with the second phone; programming a button on the first phone to send a request to the stored telephone number; initiating a telephone call from the first phone through the intermediary computing device in response to the programmed button on the first phone being triggered, wherein the request from the first phone is sent to the intermediary computing device using a wireless local area network (LAN) protocol; and re-routing the telephone call through the intermediary computing device to the second phone using the telephone network, wherein data transmitted to and from the second phone and the intermediary computing device is transmitted through the telephone network and data to and from the intermediary computing device and the first phone is transmitted through a wireless LAN.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

In general, exemplary embodiments of the subject technology provide a phone and system that restricts a user's ability to call to and receive calls from programmed and authorized telephone numbers. In an exemplary embodiment, the phone may only connect to a wireless local area network (LAN) connected device which itself is equipped to make telephone calls through the telephone or cellular network. Thus, the phone does not require its own service plan and yet provides the same phone use functionality through restricted programming. In an exemplary embodiment, the phone and system provide a training aid to children to begin learning how to use the telephone and have telephone conversations. In embodiments designed to resemble a toy phone, the phone may be designed specifically for kids to make and receive real phone calls from family and friends without the need for a parent (or other person) to initiate the call. With the touch of a button, kids can pick up or initiate a call to a restricted and controlled list of numbers that the parent (or other authorized adult) administers/controls.

The phone is also intelligent in, for example, a smart home and may interact with a variety of sensors and call features within a connected home environment. As will be appreciated, aspects of the embodiments disclosed provide a safe system for children to communicate with trusted people such as parents and grandparents without exposing children to random strangers that may call as unsolicited offers or wrong numbers dialed. Some embodiments also provide an indicator to trusted parties, which tell for example, a parent/grandparent when a child has arrived home and may be available to call. For example, some embodiments include a docking station, which sends a signal telling others whose telephone number is programmed into the phone (or a software app that tracks authorized numbers) that the child's phone is docked or the docking station detected the child's presence via a camera or sensor indicating they have arrived home. As will be appreciated, this adds a security feature in that a child's location may be tracked and their well-being monitored without having to buy them a dedicated cell phone. Still yet, some embodiments may include a remote module (separate from a phone) that receives the signal indicating presence and availability. This provides a quick and visual/audible alarm to those on the stored number network, which may be preferable to alerts on a phone that may not be checked while not in use.

Figure 1:
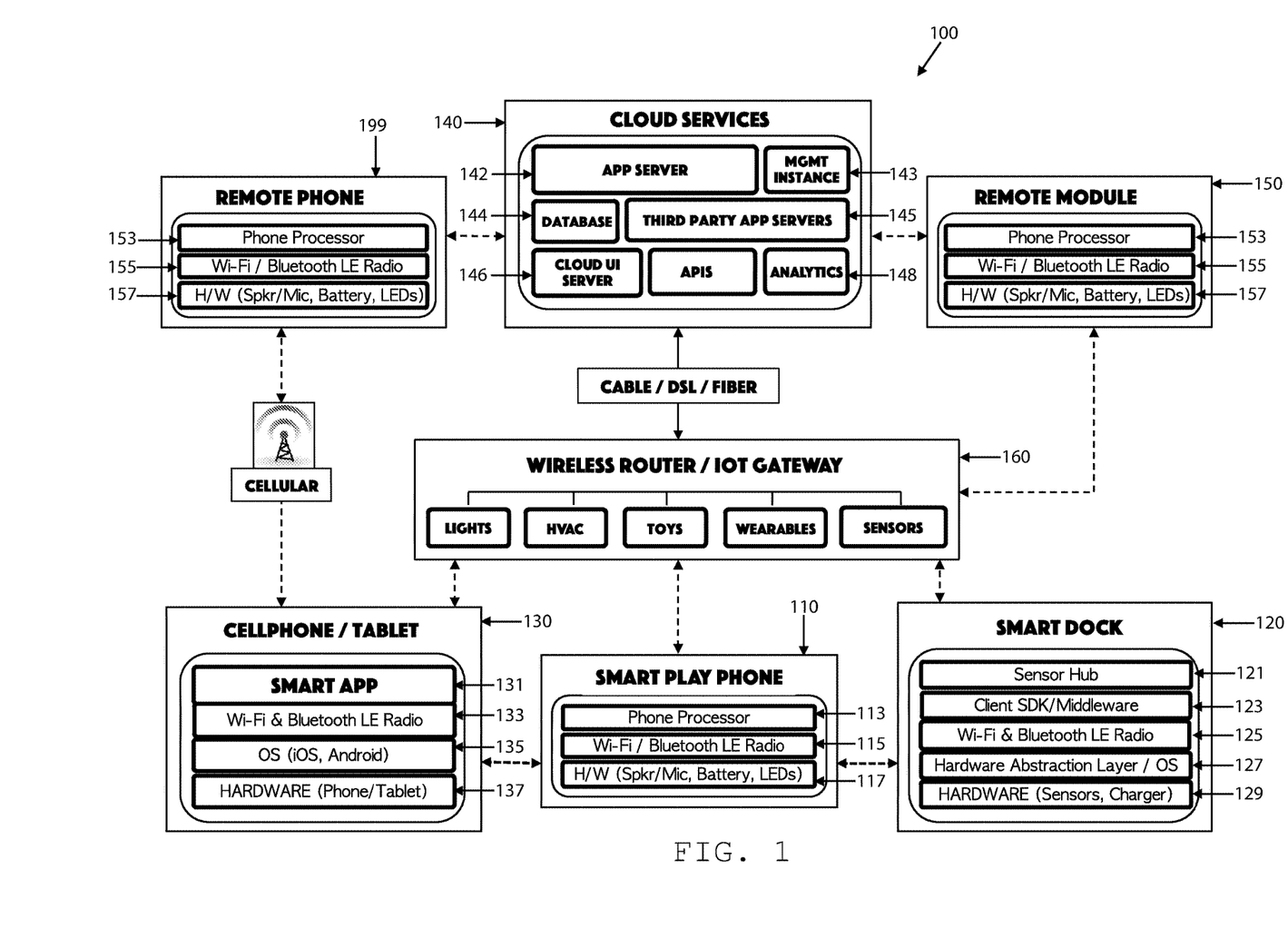
FIG. 1 is a block diagram of a smart phone platform for kids in accordance with an aspect of the subject technology.

Referring now to FIG. 1, a system 100 is shown according to an exemplary embodiment. The system 100 generally includes a phone 110 and a software application 131 that is loadable onto one or more computing devices within the system 100. The system 100 may in some embodiments, also include an intermediary computing device 130 serving as an intermediate point of communication between the phone 110 and a source/target telephone device. The system 100 may also include in some embodiments, a docking station 120, a host server/cloud based system 140, a remote module 150, and a home network/wireless router/gateway 160. Requests to communicate with the phone 110 may originate from a device such as a remote phone 199 interacting with one or more of the above elements of the system 100. The remote phone 199 is not necessarily part of the system 100 but may use for example the software application 131 for access to communicate with elements of the system 100. While the remote phone 199 is shown as a phone, other general computing devices may be used in its stead as described further below. In addition, while reference is made to the remote phone 199's telephone number, some embodiments may instead use the remote phone 199's e-mail address/service account information associated with the remote phone 199 for communication using Wi-Fi, VoIP, or Internet based calling systems.

The phone 110 may include a processor 113, a wireless LAN transceiver 115, and hardware 117. In some embodiments, the phone 110 may be designed with the appearance of a toy using ornamentation that appeals to children. Yet the function of the phone 110 provides wireless communication similar to a standard phone but with restrictions in who may be called and whom the phone 110 may receive a call from. In addition, the phone 110 may not itself be directly connectable to a telephone network (and no telephone number registered to the telephone network) thus restricting access from and to the phone 110 by the general public. The phone 110 may have a MAC address so that requests to connect with the phone 110 may be reached by signals routed to the MAC address. The processor 113 may include firmware with operating instructions for the phone 110 within the system 100 or may be coupled to a storage module in the phone 110, which may store data including phone numbers and e-mail addresses of trusted parties (or contact information in general as stored for example on the intermediary computing device 130). In embodiments with the phone 110 resembling a smart phone which includes a digital and/or touch sensitive display, a copy of the software application 131 may be stored on the phone 110 so that a user may program the buttons with phone numbers and e-mail addresses of trusted parties and program other settings as described below. A call screening function or algorithm integrated into the software app 131 may be processed at any of phone 110, docking station 120, intermediary computing device 130, and/or host server 140, and each may relay updates to the others regarding screened calls and unauthorized attempts to communicate with the phone 110. In some embodiments, the processor 113 may manage the wireless LAN transceiver 115 to communicate with other radio-enabled devices in a home network using personal area network (PAN) protocols including for example, Bluetooth LE® or Wi-Fi®. The hardware 117 may include for example, mechanical buttons, a circuit board and wiring, audio processor as part of or separate from a main circuit board, a speaker, a microphone, and a digital display.

The phone 110 hardware 117 may include for example, one or more buttons, a digital display, (for embodiments resembling a smart phone), a mechanical or inductive charging module, battery/power source, LED lights which may be internal and used to illuminate the phone in different colors (which can be seen through the phone's casing), a speaker, a microphone, and an accelerometer. The accelerometer may be used to detect for example, a handset being lifted which may trigger the processor 113 to answer an incoming call or initiate activation of the calling function. The button(s) may be programmed (for example, by use of the software app 131 communicating with the phone 110) to store a telephone number associated with the phone of a trusted party. The button(s) may be mechanical or digital if the phone 110 uses a digital display. In operation, the processor 113 may detect the press of a button and may initiate a request through the wireless LAN transceiver 115 to call the telephone number associated with the button. The request may be directed for example, to one or more intermediary computing devices 130 currently within the LAN (for example, home network). The phone 110 may also receive call requests from one of the trusted parties. An incoming call may be received from an intermediary computing device 130 that is receiving the call request in turn from a telephone device associated with one of the trusted party telephone numbers.

In an exemplary embodiment, the software application 131 is loaded onto the intermediary computing device 130 that is equipped with a wireless LAN transceiver 133 and hardware 137 including a telephone network, cellular network, or wide area network (WAN) enabled transceiver which can make wireless telephone calls as is known in the art. The software application 131 may screen incoming call requests to the phone 110. In some embodiments, call screening may also occur at the host server/cloud based system 140. An incoming call request from a remote phone 199 may be defined by a telephone call to an address associated with the phone 110. In some embodiments, the call request may also need to include the MAC address of the intermediary computing device 130 so that attempts to call the phone 110 do not circumvent the intermediary computing device 130 adding another layer of security.

Programming of the phone 110 may occur via user interface with the software application 131 from within the intermediary computing device 130. The intermediary computing device 130 may be generally described as a general purpose computing device. The following description may apply to any of the computing devices in the system 100. For example, the docking station 120, the host server/cloud based system 140, the wireless router/gateway 160 (and some devices within the home network therein), and the remote phone 199 may also be general computing devices that include elements of and function as described herein.

As may be appreciated, the following description may refer to different machines depending on the role or function being performed in the system 100. In addition, more than one general purpose computing device may be present simultaneously within one of the aforementioned blocks (for example, within the host server/cloud based system 140 and the home network/wireless router/gateway 160). The components of a general purpose computing device may include, but are not limited to, one or more processors or processing units, a system memory, and a bus that couples various system components including the system memory to the processor. The general purpose computing device may also communicate with one or more integrated, external or peripheral devices such as a keyboard, a pointing device, a display, etc.; and/or any devices (e.g., network card, modem, short range, or long range wireless transceivers, etc.) that enable the general purpose computing device to communicate with one or more other computing devices. Such communication can occur via Input/Output (I/O) interfaces. A general purpose computing device can communicate with one or more networks such as a local area network (LAN), a general wide area network (WAN), and/or a public network (e.g., the telephone network, cellular network, or the Internet) via a network adapter or radio transceiver.

A general purpose computing device may be for example, smart mobile telephone devices, personal computer systems, tablet devices, server computer systems, handheld or laptop devices, programmable consumer electronics, wearable computing devices (for example, smart watches, smart glasses, smart jewelry, etc.), multiprocessor systems, microprocessor-based systems, set top boxes, network PCs, and distributed cloud computing environments that include any of the above systems or devices, and the like.

A general purpose computing device may be described in the general context of computer system executable instructions, such as program modules, being executed by a computer system (described for example, below). In some embodiments, a general purpose computing device may be a cloud computing node connected to a cloud computing network (for example, as represented in host server/cloud based system 140). A general purpose computing device may be practiced in distributed cloud computing environments where tasks are performed by remote processing devices that are linked through a communications network. In a distributed cloud computing environment, program modules may be located in both local and remote computer system storage media including memory storage devices.

A general purpose computing device as described herein may typically include a variety of computer system readable media. Such media could be chosen from any available media including non-transitory, volatile and non-volatile media, removable and non-removable media. The system memory could include one or more computer system readable media in the form of volatile memory, such as a random access memory (RAM) and/or a cache memory. By way of example only, a storage system can be provided for reading from and writing to a non-removable, non-volatile media device (for example, disk storage or flash memory) (not shown). The system memory may include at least one program product having a set (e.g., at least one) of program modules that are configured to carry out the functions of embodiments of the invention. The program product/utility, having a set (at least one) of program modules, may be stored in the system memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the invention as described herein.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain, or store a program (for example, the program product 131, which is sometimes referred to simply as the "software app 131") for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the intermediary computing device 130, the software app 131 is generally run by an operating system 135. The processor of the intermediary computing device 130 may detect when a request for a phone call is made from the phone 110. The processor may also detect when a request to communicate with the phone 110 is made from a remote telephone 199's telephone number (or e-mail address) that is authorized to access the phone 110. The processor may coordinate data received from the phone 110 through the intermediary computing device's short range transceiver (for example, communicating through Bluetooth® or Wi-Fi® protocols) and re-route the communication to and from the phone associated with the authorized telephone number through the intermediary computing device's long range transceiver (for example, telephone network/cellular data radio).

Some embodiments may include a smart docking station 120 that is designed to receive the phone 110 when not in use and present in the home environment. The docking station 120 may include a sensor hub 121 which detects when the phone 110 is docked or within proximity of the home network. This may be useful in embodiments for which the end user (for example, a child) may travel with the phone 110 throughout the day and arrives home in possession of the phone 110. Arrival and/or docking may trigger the docking station 120 to activate hardware 127 (for example a charger to start charging or a light source to activate a light or change the color of illumination for the docking station 120). The phone's color may change to represent status or use with one of the favorites programmed into the phone 110. The favorites may represent the telephone number or e-mail address of remote phones 199 that are programmed in as trusted parties. Color change may trigger when either the child pushes one of the pre-programmed buttons associated with a telephone number or the phone 110 automatically switches to the default favorite/color based on time of day and the profile setting administered by a parent. As may be appreciated, the colored illumination may be attractive to a child and yet provides valuable information to a parent obviating the need to ask the child with whom are they speaking. Arrival and/or docking may also trigger the docking station 120 to transmit via a wireless local area network (LAN) transmitter 125, a signal indicating the phone 110 is docked/home which may indicate the end user's availability or at least their presence in the home. Software 123 (which may be part of the software application 131) programmed into the docking station 120 may make determinations based on criteria programmed into the docking station 120. The software 123 may for example, determine the end user's status of availability based on the time of day, amount of phone usage within a time frame, and the source of an incoming call.

The docking station 120 may also be a smart dock. In some embodiments, the docking station 120 may function as the end device for receiving a phone call (for example without the use of the phone 110) using its speaker and microphone to interact with the call. The docking station 120 may also receive signals from other home network 160 smart devices and may likewise provide data detected by sensors on the docking station 120 to other smart devices. Additional details of interaction are described below.

The docking station 120 may also include a hardware abstraction layer/operating system 127, which in embodiments that include a display and user interface, allow a user (for example, a parent) to set control rules and interface with the adult user's account that can be accessed through the intermediary computing device 130 or directly with the docking station 120 through the display. In some embodiments, the docking station may function even without the use of the phone 110. The docking station 120 may have its own MAC address (or share the same address as the phone 110). In embodiments without a display integrated into the docking station 120, the docking station 120 may include a port so that a user (for example, a parent) may access the hardware abstraction layer/operating system 127 so that a mobile computing device with an electronic display can supplement interaction with the docking station 120. As may be appreciated, the docking station 120 may be used to provide a kiosk that allows the user to turn the docking station 120 into for example, a video chat station when connected with another computing device. In other embodiments, the docking station 120 may include an integrated display so that video chatting, whether in the context of receiving a call from a pre-programmed party ("favorite") outside the home, or as a video intercom connected to other smart devices within the home network becomes available.

In some embodiments, a call to the phone 110 may be performed while the phone 110 is docked. The docking station 120 may determine whether the call is being transferred in from the intermediary computing device 130 or through the wireless router/gateway 160. Bluetooth® protocol may also be used to initiate communication from the docking station 120 to other devices in the LAN (for example, as shown in the wireless router/gateway box 160 which includes wirelessly connected devices including lighting, HVAC controls, toys, wearable devices, and sensors), which can allow for example, the docking station 120 to be operated as a handset paired with another computing device. The OS 127 may use PAN based protocols such as BLE® signals to the docking station 120 to receive advanced services such as sensor activated calls and tracking milestone achievements. The docking station 120 may receive responses and collect historical data from other client devices/sensors in the LAN. The docking station 120 may also automatically initiate a call or playback of a stored audio file to the phone 110 or from a remote server (for example, by the host server/cloud based system 140) based on the behaviors that the client SDK/middleware software 123 has learned from the device/sensors.

The docking station 120 may in some embodiments, include a camera and the processor may detect motion or use facial detection to determine the child's presence at home and availability. Some embodiments may be tied to the home network (described in more detail below) so that a wearable device (for example, a smart home key fob and other wearables) might also provide trigger events informing the system 100 of changes in the presence of a child coming home or leaving.

In some embodiments, communication between the phone associated with the authorized telephone number and the intermediary computing device 130 (or in some embodiments, direct communication with the phone 110) may be managed by the host server/cloud based system 140. The system 140 may include an application-based server 142 managing the operations of the software application 131 from a central point. A database server 144 may store phone 110 database entries and associated favorite/pre-programmed telephone numbers and identities of the number owners, schedules, and profiles. For embodiments geared toward children, the database server 144 may use cloud storage for stored audio files (for example, family recordings and recorded character voice calls) that can be sent to the end user child by adult selected scheduling. A management instance module 143 may manage routing of a call request from either the phone 110 to a stored contact or vice versa. The management instance module 143 may also perform operations such as checking to see if a telephone number from a remote phone 199 attempting to connect with the phone 110 is authorized, checking to see if the current status of the phone 110 is available for a call (for example, the phone 110 may have a status of being docked but the end user is scheduled for another activity at that time and is otherwise unavailable to speak), and coordinating whether the call is purely audio based or may include a video chat session.

The host server/cloud based system 140 may also include an analytics module 148 which may provide a particularly wealthy source of beneficial information. The analytics module 148 may receive data through the home network/wireless router/gateway 160 about smart sensors within the user's home. Sensor events could come from any of the following devices: a smart high chair; a smart crib/bed; a smart backpack; a smart lunch box; a smart toys; a smart toothbrush; a smart bathtub; proximity key fobs; and other Internet of Things sensors (motion detectors, cameras, door/window sensors, temperature sensors, light sensors). The analytics extrapolated from the host server/cloud based system 140 may detect patterns, trends and outliers (leveraging the server instance module 143) and may invoke calls to the phone 110 and/or the docking station 120, and/or analytics reports to the intermediary computing device 130 depending on the trend/outlier observed. For example, a child's bed sensor may broadcast its sleep time for the night, and if it's lower than the average trend, then the system 100 may send an email or alert to parent, and set up a call to the phone 110 that night reminding the child to sleep earlier to get back on the right sleep cycle. A fitness monitoring device worn by the child may track activity levels (such as steps taken, average elevated hear rate time, etc.) so that a call to the phone 110 may congratulate an active day or encourage more activity. Some of the activity can be encouraged directly by the system 100 through the introduction of games. The system 100 may for example, provide a form of "Hide and Seek" by using the phone 110 as a BLE® receiver/transmitter to locate another nearby BLE® device. The system 100 may also provide a form of "Simon Says" by having the child listen to the phone 110 which uses a character voice to tell the child what to do. For phone 110 embodiments that include a camera, the child's movements may be analyzed at the system 140 to determine whether the child moved (or avoided moving) correctly. Brain exercises may also be promoted by providing number games with the child's input tracked by a 0-9 keypad on the docking station 120. Other healthy habits related to activity levels may be tracked by smart devices including for example an accelerometer and may be provided to the analytics module 148. For example, eating habits may be tracked through a smart high chair with an accelerometer which, may detect long periods of inactivity and then shorter periods of activity while eating which would approximate the start and end times of meals. Eating times becoming longer or shorter can indicate either hunger or a child enjoying/disliking their food. This information becomes available to the parent through the software application 131 for evaluation and potential adjustment of the activity. A similar approach enables tracking a variety of activities throughout the home, by collecting accelerometer activity from other smart devices including for example, a desk, a bathtub, a toothbrush, a lunchbox, a bed, etc. so that, a daily routine can be determined and analytics used to find out key changes that may be provided to the smart phone 110 and/or docking station 120 to provide for example, messages encouraging more movement, getting up on time/going to sleep on time, eating at better hours, reminders related to hygiene, etc. Milestones that are achieved may be archived for future review and to use in triggering positive messages sent to the phone 110.

The host server/cloud based system 140 may also include third party app servers 145 which may be for example, applications related to other devices. A fitness device or sleep wearable device may have their own applications that can be accessed and whose information can be analyzed along with the data provided by the system 100. Some third party applications may include features that may complement the smart phone platform and APIs would enable the communication to the phone 110, docking station 120, remote module(s) 150, and home network 160 smart sensors. As an example, eating times detected by the system 100 may be provided to the third party app servers 145 to supplement analysis related to behavior. These would enable the phone 110 to integrate with existing smart home technologies and for example place a character voice call to the phone 110 indicating "it's time for bed" and then set the temperature in the child's room and turn on the night light. In another embodiment the remote module 150 may act as a night light and an audio monitor in the child's room to alert the parent of an unexpected sound/presence that could indicate an intruder. Another example of connecting to third party servers 145 includes using voice integration with a smart home voice command module (for example Google Home® or Amazon Echo®) or a custom voice porting effort on the smart dock, to enable kids to place calls with a voice request such as "call Dad" eliminating the need to push a button on the phone or docking station.

Some embodiments may include a remote module 150 that is tied to one or more phones 110. The remote module 150 may be a useful item for parents or other users designated as trusted parties associated with the phone 110 (for example, extended family members). The remote module 150 may include its own processor 153, a short-range transceiver 155 for wireless LAN use, and various hardware components 157 (for example, a speaker, microphone, LED lighting, etc.). The remote module 150 may be for example a smart puck that may be placed on a tabletop or mounted to a wall surface. The remote module 150 may be paired via the short-range transceiver 155 to the remote phone 199 associated with one of the phone 110 stored contacts. In an exemplary embodiment, the remote module 150 includes an embodiment of the software application 131, which may periodically ping the host server 140 or the docking station 120 for a status update of the phone 110. In response to the docking station 120 sending a signal indicating a change in status (for example, the phone 110 is docked or home, availability status changes, etc.), the processor 153 may trigger one of the pieces of hardware 157 to operate (for example, change illumination color, display an alert, sound an audible alarm/beep). For example, pushing one of the "favorites" buttons on the phone 110 or docking station 120 may cause the phone 110 to change color status for that "favorite" (stored contact). That contact's remote module 150 may change color to green indicating that the phone 110 is ready to receive a call. Some remote modules 150 may be tied to more than one phone 110, in which case a section of the remote module 150 or an individual light may change color. Other remote modules 150 (or module sections, lights) associated to the account can remain green or switch to red if outside of a child's availability zone. A parental profile in the software app 131 administers these settings. As may be appreciated, in some embodiments different trusted parties may have different times of availability to access a phone 110. For example, access through the software app 131 may allow an administrator to associate a mother by the color purple with access between 8 am-4 pm, a father by the color orange with access from 4-6:30 pm, and one grandparent by the color green with access between 6:30-9 pm PST for eastern time zone, etc.).

In response to an alert indicating availability, the owner of the remote module 150 may then call the phone 110 using their phone 199 associated with the stored number on phone 110 or may use the remote module 150 as a handset by triggering a function that connects/pairs the remote module 150 to the phone. The remote module 150 may also have pre-programmed buttons tied to one or more phones 110 so that the user may simply press one of the pre-programmed buttons to initiate a call. A button on the remote module 150 when pushed could send an alert to the parent (for example to the intermediary computing device 130 or otherwise a parent's mobile phone). The remote module 150 may use its speaker, microphone, and transceiver 155 to hold a telephone call with the phone 110 conveniently from its current location, saving for example, a grandparent from having to find their phone 199 and or work the software app 131 to locate and call the phone 110 address.

Figure 2:
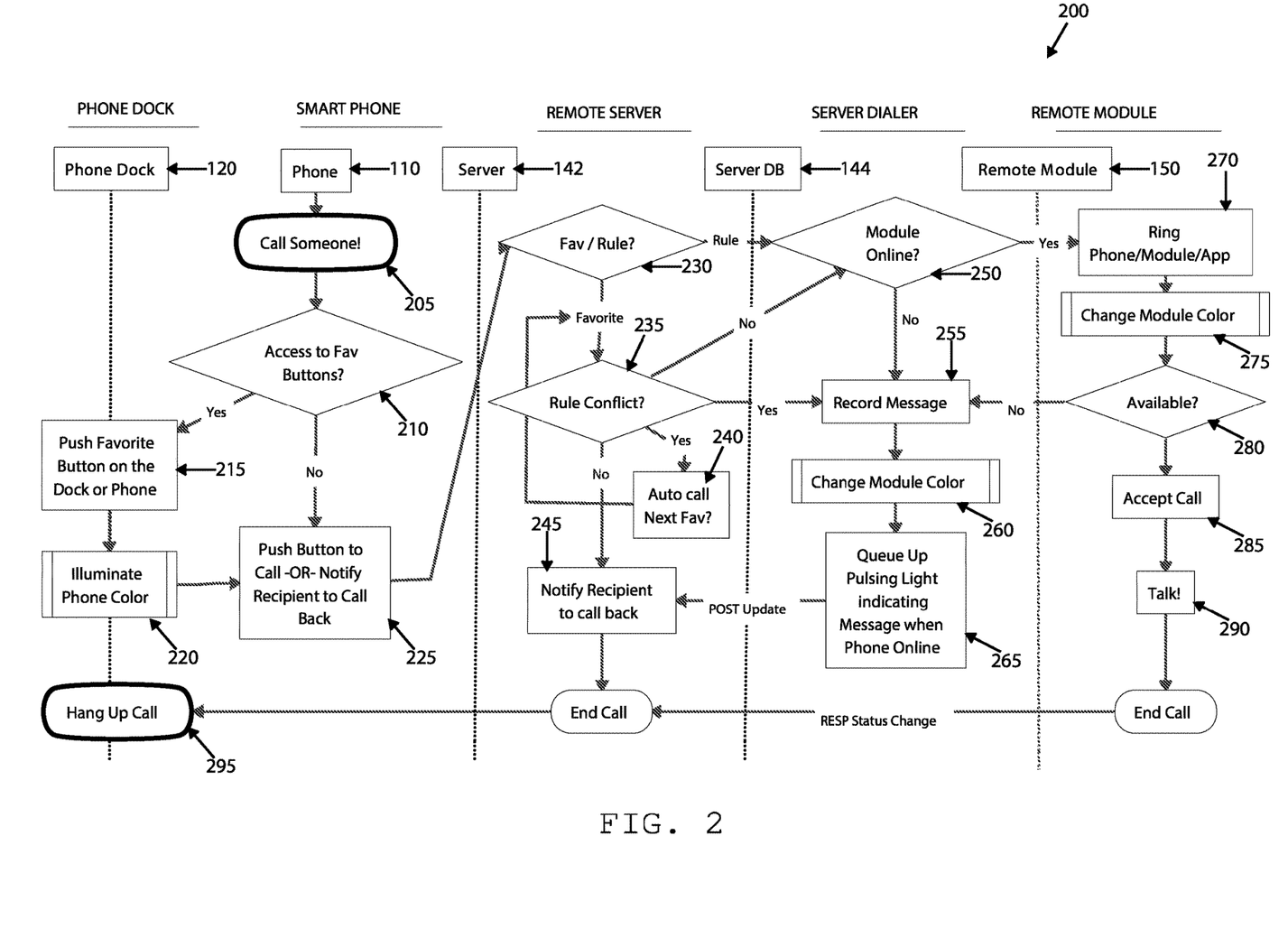
FIG. 2 is a flowchart of a method of calling a favorite person from a smart phone platform to a remote phone or remote module in accordance with an aspect of the subject technology.
Figure 3:
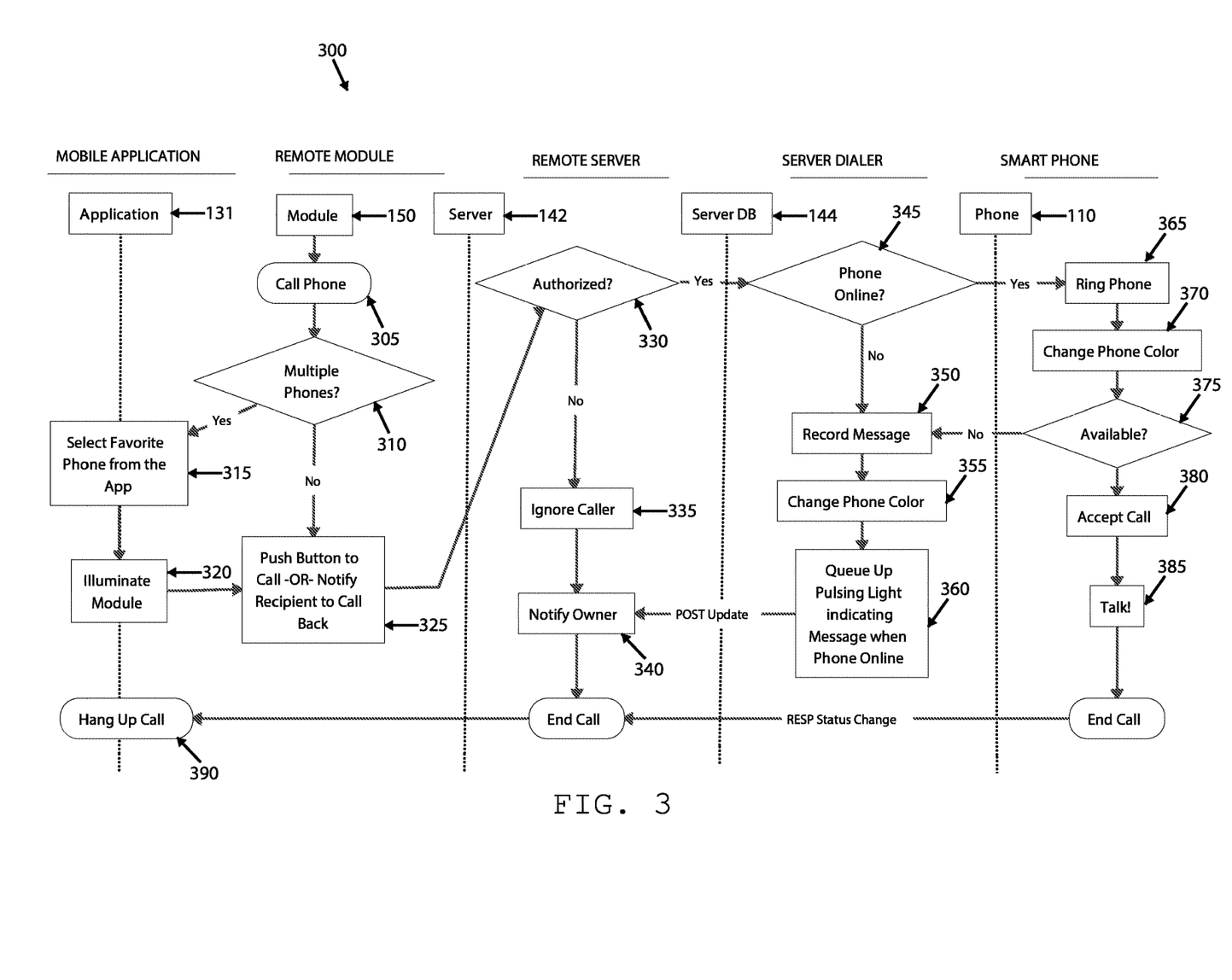
FIG. 3 is a flowchart of a method of receiving a call at the smart phone platform from a favorite person using a remote phone, other remote computing device, or a remote module in accordance with an aspect of the subject technology.

Referring now to FIGS. 2-3, flowcharts of methods for operating the embodiments described above from both the phone 110 side and from a remote caller side are shown according to exemplary embodiments. A processor generally performs actions unless indicated otherwise.

FIG. 2 shows a method 200 of calling a favorite person from a smart phone platform (for example, the phone 110 described above) to a remote phone 199 or remote module (for example the remote module 150) or smart app in accordance with an exemplary embodiment. A user may initiate (205) a call using the phone 110. A determination (210) may be made whether the user has access to telephone numbers stored as favorites/contacts pre-programmed into one or more buttons. If the user has stored favorites, the user may push (215) a button associated with a stored contact on the phone or a button on a docking station 120 holding the phone. As described above, the call request may be made through a short-range signal within a LAN to another device equipped with telephone or cellular network access, which in turns routes the call request to the other party (favorite/stored contact or other designated recipient). In other embodiments, the call request and subsequent telephone conversation may occur directly through a Wi-Fi call through the telephone network or VOW protocol. In some embodiments, a color associated with the stored contact may illuminate the phone. In response to the button push, the phone 110 may send a request (225) to call the other party or may send a message notifying the other party to call back. The request to the other party may be checked at a host server 142 to determine (230) whether the call recipient (other party) is an authorized contact and if so, if a rule prohibits contact at this time. Data or criteria for authorized contacts and rules may be referenced from a server database 144.

If the favorite is subject to a rule, a determination (235) is made whether the rule in place conflicts with receiving a call from the phone 110 at this time. If the rule shows no conflict, then the recipient may be notified (245) to return a call to the phone 110. If a rule conflict is present, the system may automatically call (240) another stored contact (if one exists) or may allow the phone 110 user to record (255) a message for the recipient.

If the determination (230) allows the phone 110 to access the recipient, the server 142 may dial the other party and determine (250) whether the other party's phone 199 or remote module 150 is online and available to receive a call.

If the other party is offline, the user may record (255) a message. A processor may change the color of the remote module 150 (which may also be shown at the phone 110) to indicate the recipient's status is currently unavailable. In some embodiments, the remote module 150 may have a light pulse (265) to indicate a message is available and when checked, may receive the notification (245) to call the phone 110 back.

If the other party is online, the other party's' phone 199 or remote module 150 may ring (270). An incoming call request to the other party's phone 199 or remote module 150 may trigger (275) a change in illumination color at the remote module 150. A determination (280) may be made on the other party's availability. The other party may accept (285) the call or the phone 110 user may be presented the option to record (255) a message. If the call request is accepted, the phone 110, the process facilitates the parties to speak (290). Once the conversation is over or the other party could not be reached, the call request terminates (295).

Referring now to FIG. 3, a process 300 of calling a phone (for example phone 110) from a remote phone 199 or remote module (for example remote module 150) or smart app is shown according to an exemplary embodiment. From the remote phone 199 or remote module 150, the user initiates (305) a call request to the phone 110. A determination (310) is made whether the calling party is associated with multiple phones 110. If so, the caller may select (315) which phone 110 to call using a software application 131. In some embodiments, if the caller has a remote module 150, the remote module 150 may illuminate (320) to indicate call being made (the color illuminated may indicate which phone 110 is being called). The selected phone 110 may be called (325) or sent a notification to call the remote phone 199 back. As described above, the call request from the remote phone 199 may be sent initially through a telephone or cellular network provider which may be re-routed through an intermediary computing device 130 to a LAN connection connected to the phone 110. A remote host server 142 may determine (330) by referencing a server database 144 whether the remote phone 199 is authorized to communicate with the phone 110. If not, the remote caller may automatically be ignored by the host server 142 and does not pass on the call request to either the intermediary computing device 130 or the phone 110. The phone 110 owner (or the owner of the intermediary computing device 130 which may be a parent of the phone 110 owner) may be notified (340) of the call attempt. If the caller is authorized, a server dialer may determine (345) whether the phone 110 is online. If not, the caller may record (350) a message, which may trigger (355) the phone 110 to change color indicating a missed call, and the phone 110 lighting may pulse (360) indicating a message is waiting. If the caller is online, the phone 110 may ring (365). The phone 110 may change color (370) signaling that a call from a stored or authorized contact is incoming. If the phone 110 owner is available (375), the owner accepts (380) the call and the conversation starts (385). If the owner is unavailable, the caller may be presented the option to record (350) a message. Once the conversation ends or the owner is otherwise unavailable, the call terminates (390).

The description provided above provides several advantages and the potential for several features which may be especially attractive to parents and children. The embodiments described above provide for example, the ability to initiate a voice call or accept an incoming voice call with the push of one button. The phone 110 may receive updates from other nearby BLE® devices which may trigger the following events that promote good behavior and provide incentive to children:

receive character voice calls from kids' favorite TV show/movie characters;

receive calls (with a parent's voice or character voice) encouraging kids to do any of the following themes (with example messages shown in quotation marks):

exercise (either parent or favorite character "Time for exercise" or "Lets Jump around" or "Let's Dance");

clean Up ("Time to pick up your toys");

meal time ("Time for dinner!");

bath time ("Time for a bath!");

bed time ("Time for bed!");

brush teeth ("Time to brush your teeth!");

school time ("Time for School!" or "Time to do your homework");

reading time ("Time to read before bed, pick out a book!").

The following are a list of milestone and goals that can trigger a message received at the phone 110 (Initiated from sensor events):

finishing meals ("Great job eating your dinner!<Mom/Dad/Character> is so proud of you!");

performing exercise goals ("Great job exercising today" "Wow congrats you set a new record for steps today!");

waking up on time/going to sleep on time ("Wakey wakey!", "Is someone tired today, let's get to bed early tonight!");

reaching a birthday ("Happy Birthday!");

reaching holidays ("Merry Christmas!", "Happy 4th of July!", etc.).

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer program product for connecting a telephone call between a first phone which is not directly connected to a telephone network and a second phone which is connected to the telephone network through an intermediary computing device, the computer program product comprising a non-transitory computer readable storage medium having computer readable program code embodied therewith, the computer readable program code being configured, when executed by a computer processor, to:

store a telephone number associated with the second phone;

program a button on the first phone to send a request to the stored telephone number;

initiate a telephone call from the first phone through the intermediary computing device in response to the programmed button on the first phone being triggered, wherein the request from the first phone is sent to the intermediary computing device using a wireless local area network (LAN) protocol;
re-route the telephone call through the intermediary computing device to the second phone using the telephone network, wherein data transmitted to and from the second phone and the intermediary computing device is transmitted through the telephone network and data to and from the intermediary computing device and the first phone is transmitted through a wireless LAN; and
transmit from a docking station holding the first phone in a docked state, a signal through an Internet connection to a remote module indicating the first phone is docked.

2. The computer program product of claim 1, wherein the intermediary computing device is a wireless gateway connected to a host server operable to make wireless telephone calls.

3. The computer program product of claim 1, further comprising computer readable program code configured to:
determine whether a call recipient associated with the second phone is an authorized contact; and
determine whether a stored rule prohibits contact by the first phone with the second phone at time associated with the telephone call.

4. The computer program product of claim 3, further comprising computer readable program code configured to automatically call a second stored telephone number in response to a determination that the stored rule prohibits contact by the first phone with the second phone at time associated with the telephone call.

5. The computer program product of claim 1, further comprising computer readable program code configured to illuminate the first phone with a color associated with the stored telephone number of the second phone.

6. The computer program product of claim 1, further comprising computer readable program code configured to:
detect a presence of the first phone; and
transmit a signal to a remote module indicating the detected presence of the first phone.

7. The computer program product of claim 6, further comprising computer readable program code configured to illuminate the remote module with a color associated with the detected presence of the first phone.

8. A method for connecting a telephone call between a first phone which is not directly connected to a telephone network and a second phone which is connected to the telephone network through an intermediary computing device, comprising:
storing a telephone number associated with the second phone;
programming a button on the first phone to send a request to the stored telephone number;
initiating a telephone call from the first phone through the intermediary computing device in response to the programmed button on the first phone being triggered, wherein the request from the first phone is sent to the intermediary computing device using a wireless local area network (LAN) protocol;
re-routing the telephone call through the intermediary computing device to the second phone using the telephone network, wherein data transmitted to and from the second phone and the intermediary computing device is transmitted through the telephone network and data to and from the intermediary computing device and the first phone is transmitted through a wireless LAN; and
transmitting from a docking station holding the first phone in a docked state, a signal through an Internet connection to a remote module indicating the first phone is docked.

9. The method of claim 8, wherein the intermediary computing device is a wireless gateway connected to a host server operable to make wireless telephone calls.

10. The method of claim 8, further comprising:
determining whether a call recipient associated with the second phone is an authorized contact; and
determining whether a stored rule prohibits contact by the first phone with the second phone at time associated with the telephone call.

11. The method of claim 10, further comprising automatically calling a second stored telephone number in response to a determination that the stored rule prohibits contact by the first phone with the second phone at time associated with the telephone call.

12. The method of claim 8, further comprising illuminating the first phone with a color associated with the stored telephone number of the second phone.

13. The method of claim 8, further comprising:
detecting a presence of the first phone; and
transmitting a signal to a remote module indicating the detected presence of the first phone.

14. The method of claim 13, further comprising illuminating the remote module with a color associated with the detected presence of the first phone.

15. A computer program product for connecting a telephone call between a first phone which is not directly connected to a telephone network and a second phone which is connected to the telephone network through an intermediary computing device, the computer program product comprising a non-transitory computer readable storage medium having computer readable program code embodied therewith, the computer readable program code being configured, when executed by a computer processor, to:
store a telephone number associated with the second phone;
program a button on the first phone to send a request to the stored telephone number;
initiate a telephone call from the first phone through the intermediary computing device in response to the programmed button on the first phone being triggered, wherein the request from the first phone is sent to the intermediary computing device using a wireless local area network (LAN) protocol;
re-route the telephone call through the intermediary computing device to the second phone using the telephone network, wherein data transmitted to and from the second phone and the intermediary computing device is transmitted through the telephone network and data to and from the intermediary computing device and the first phone is transmitted through a wireless LAN;
determine whether a call recipient associated with the second phone is an authorized contact; and
determine whether a stored rule prohibits contact by the first phone with the second phone at time associated with the telephone call.

16. A method for connecting a telephone call between a first phone which is not directly connected to a telephone network and a second phone which is connected to the telephone network through an intermediary computing device, comprising:
storing a telephone number associated with the second phone;

programming a button on the first phone to send a request to the stored telephone number;
initiating a telephone call from the first phone through the intermediary computing device in response to the programmed button on the first phone being triggered, wherein the request from the first phone is sent to the intermediary computing device using a wireless local area network (LAN) protocol;
re-routing the telephone call through the intermediary computing device to the second phone using the telephone network, wherein data transmitted to and from the second phone and the intermediary computing device is transmitted through the telephone network and data to and from the intermediary computing device and the first phone is transmitted through a wireless LAN;
determining whether a call recipient associated with the second phone is an authorized contact; and
determining whether a stored rule prohibits contact by the first phone with the second phone at time associated with the telephone call.

* * * * *